United States Patent [19]
Daniel et al.

[11] Patent Number: 5,455,940
[45] Date of Patent: Oct. 3, 1995

[54] METHOD FOR ABNORMAL RESTART OF A MULTIPROCESSOR COMPUTER OF A TELECOMMUNICATION SWITCHING SYSTEM

[75] Inventors: Hans-Georg Daniel; Karel Engelsmann, both of Munich; Harald Eggers, Vierkirchen, all of Germany

[73] Assignee: Siemens Aktiengesellschaft, Munich, Germany

[21] Appl. No.: 352,870

[22] Filed: Dec. 2, 1994

Related U.S. Application Data

[63] Continuation of Ser. No. 829,419, Feb. 3, 1992, abandoned.

[30] Foreign Application Priority Data

Feb. 1, 1991 [EP] European Pat. Off. .............. 91101377

[51] Int. Cl.⁶ ..................................................... G06F 11/20
[52] U.S. Cl. ............... 395/182.02; 395/650; 395/182.18; 395/311; 364/DIG. 1; 364/285.2; 364/268.3; 364/268.9
[58] Field of Search ................ 364/DIG. 1, DIG. 2; 395/575

[56] References Cited

U.S. PATENT DOCUMENTS

| | | | |
|---|---|---|---|
| 4,628,508 | 12/1986 | Sager et al. ................... | 371/9 |
| 4,648,031 | 3/1987 | Jenner ........................ | 395/575 |
| 4,925,311 | 5/1990 | Neches et al. .............. | 364/200 |
| 4,941,087 | 7/1990 | Kap .............................. | 395/725 |
| 4,949,251 | 8/1990 | Griffin et al. ................. | 395/575 |
| 4,977,500 | 12/1990 | Ogata et al. .................. | 395/575 |
| 5,018,097 | 5/1991 | Kuhlmann .................... | 395/700 |
| 5,047,923 | 9/1991 | Elstmer et al. .............. | 395/600 |
| 5,065,311 | 11/1991 | Masai et al. .................. | 395/575 |
| 5,134,712 | 7/1992 | Yamamoto .................... | 395/800 |

OTHER PUBLICATIONS

"Periphere Anschlussgruppen im System EWSD", Rudolf Borger et al Telcom Report 4 (1981) pp. 19–27.
"No. 5 ESS—Strategies For Reliability In A Distributed Processing Environment", J. E. Allers et al, Digest Papers 13th Annual International Symposium on Fault Tolerant Computing, Jun. 1983, IEEE, New York, pp. 388–391.

Primary Examiner—Kevin A. Kriess
Assistant Examiner—Lucien Toplu
Attorney, Agent, or Firm—Hill, Steadman & Simpson

[57] ABSTRACT

A master processor executes both switching-oriented and nonswitching-oriented functions and the other processors execute only switching-oriented functions. The processes to be executed are rendered independent of one another to such an extent that an interprocess communication between switching technology and nonswitching technology can be foregone for a brief time. Given errors in the implementation of nonswitching-oriented processes, only these are aborted and are restarted after the production of an initial condition, whereas the switching-oriented processes are executed practically without interruption. Data arising during this time and intended for nonswitching-oriented processes are intermediately stored up to the restart. The result is a far-reaching avoidance of lost connections.

4 Claims, 2 Drawing Sheets

METHOD FOR ABNORMAL RESTART OF A MULTIPROCESSOR COMPUTER OF A TELECOMMUNICATION SWITCHING SYSTEM

This is a continuation, of application Ser. No. 829,419, filed Feb. 3, 1992.

BACKGROUND OF THE INVENTION

1. Field of the Invention

The present invention relates to a method for the abnormal restart of a multiprocessor computer of the telecommunication switching system in which one processor, from a plurality of processors, implements both switching-oriented, as well as nonswitching-oriented jobs, particularly operations-oriented jobs and other processors therein merely implement the switching-oriented jobs. The term "abnormal restart" as used herein means a restart that differs from a standard restart, wherein all cyclical processes are aborted and restarted, for example, abnormal restarts due to the occurrence of software errors or hardware errors.

2. Description of the Prior Art

Different categories of start-up procedures have heretofore been applied in multiprocessor computers of the type set forth above, these start-up computers differing with respect to the scope of the involvement in the previous processor action and in the scope of the portions of the multiprocessor computer unit that are involved in the event of such a start-up process.

The most frequent start-up stage is thereby a restart in which all cyclical processors are aborted and restarted. In a multiprocessor computer composed of what is referred to as a master processor that must implement both switching-oriented and non-switching oriented jobs, of what is referred to as a spare processor that is kept ready for assuming the task of the master processor in the case of malfunction and, potentially, executes switching-oriented jobs in addition, as well as of further processors that are exclusively for executing switching-oriented jobs, all of these processors are thereby involved.

Since the duration of the initialization, in conjunction with switching technology processors is linearly dependent on the plurality of connected subscribers, interruption time periods of 10s and greater result in telephone switching systems of medium size. As a result losses of connections are also registered in conjunction with such restarts to a magnitude that is not accepted by the system operators given a relatively frequently-occurring type of restart.

SUMMARY OF THE INVENTION

It is therefore the object of the present invention to provide a method for a restart of a multiprocessor computer that, given basically the same conditions for the implementation of restart, manages with a lower number of loss connections, if not even without any and all loss of connections.

The above object is achieved, according to the present invention in a method for restart of a multiprocessor computer of a telecommunication switching system in which one processor from a plurality of processors thereof implement both switching-oriented and nonswitching-oriented jobs, particularly operations-oriented jobs, and the other processors only implement switching-oriented jobs. The method is particularly characterized in that the switching-oriented and nonswitching-oriented processes to be executed within the framework of the implementation of the jobs are made independent of one another to such an extent that the station traffic between these two processors can be briefly foregone; in that, given errors that do not lie in the execution of switching-oriented processes, only the nonswitching-oriented processes are aborted and are subsequently restarted after the production of an initial condition, by contrast whereto the switching-oriented processes continue to be executed practically without interruption, and in that data that arrives during this execution of switching-oriented processes for processing by the nonswitching-oriented processes is intermediately stored until the restart of the nonswitching-oriented processes.

Therefore, and according to the present invention, errors that do not lie in the execution of switching-oriented processes are given special treatment in that a new restart category is created therefor in which only the nonswitching-oriented processes are aborted and are. In turn, restarted after an initial status has been produced, in contrast the switching-oriented processes continue to be executed practically without interruption, and appropriate conditions therefor are created by such a far-reaching de-interlacing of the nonswitching-oriented and switching-oriented processes that station traffic between these two type of processors can be foregone for a brief time. Alternatively, data that occurs during execution of switching-oriented processes and intended for the processing of nonswitching-oriented processes is not lost due to the possible lack of station traffic condition during the interruption of the nonswitching-oriented processes.

According to a particular feature and development of the invention, care is exercised to see that user inputs that are intended for processing by nonswitching-oriented processes and that arise during the interruption thereof are not lost in that either the user is requested to repeat the inputs on the basis of a corresponding signaling or in that the user inputs are intermediately stored.

In accordance with a further feature and development of the invention, which is directed to a multiprocessor construction, spare processor is provided that assumes the jobs of the master processor given a hardware fault, and is kept ready in a standby mode in addition to the master processor, the processor that executes both switching-oriented and nonswitching-oriented jobs. On the basis of the appropriate modification of the method of the invention, the restart required in conjunction with a switching is also modified such that, in comparison to previous conditions, an optimally-low loss of connections occurs. Dependent upon whether an operating mode is present in which switching-oriented processes had already been started by the previous standby processor, the switching-oriented executions are further executed practically without interruption on the replaced new master processor after the switch are restarted. This, however, is done without an initialization of the appertaining data base, resulting therein that the interruption of the switching-oriented processes, even in the latter case, last only for such a time that at most one connection in the course of being established is lost.

BRIEF DESCRIPTION OF THE DRAWINGS

Other objects, features and advantages of the invention, its organization, construction and operation will be best understood from the following detailed description, taken in conjunction with the accompanying drawings, in which.

DESCRIPTION OF THE PREFERRED EMBODIMENTS

Figure 1:
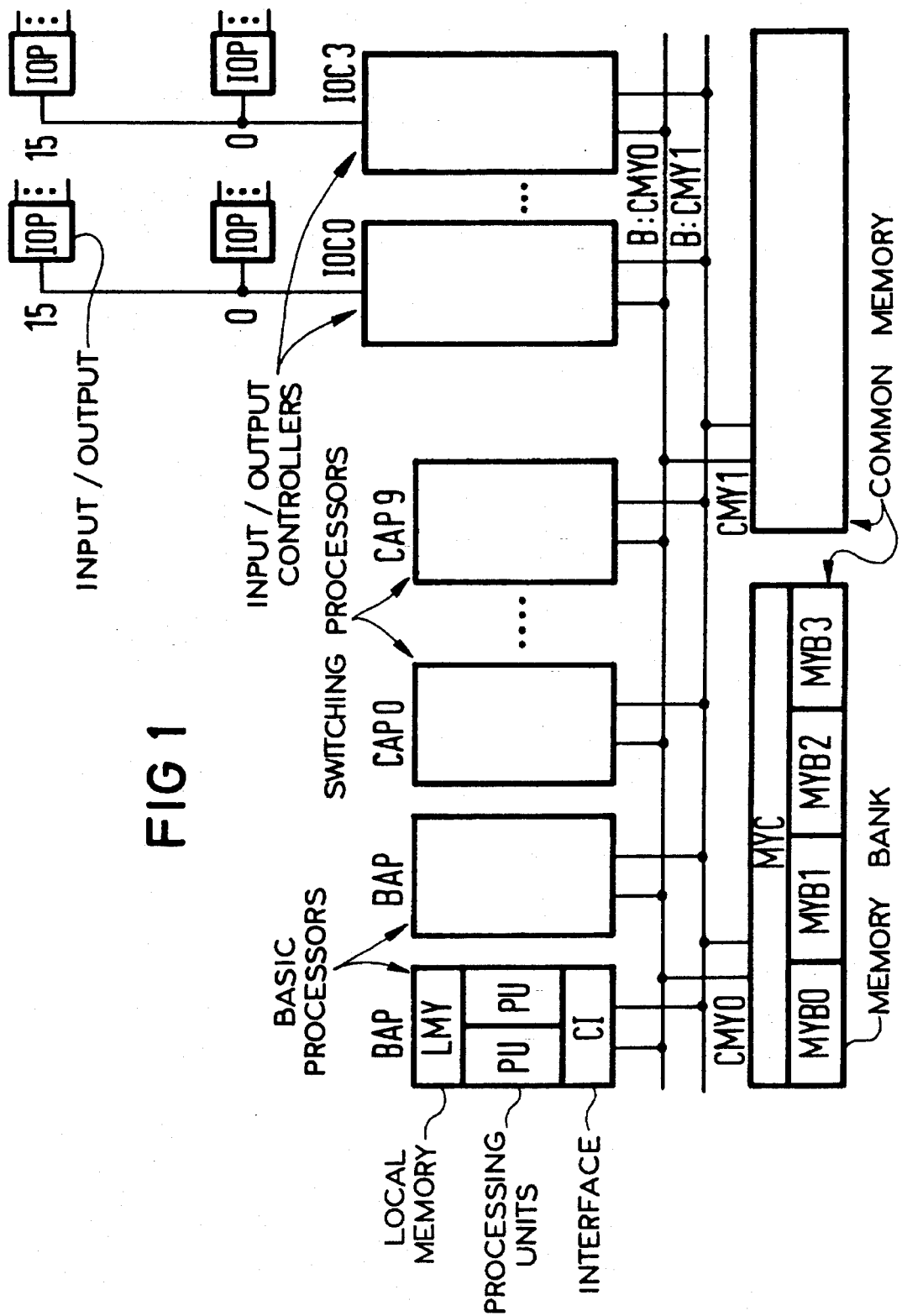
FIG. 1 is a block circuit diagram of a multiprocessor computer to which the method of the present invention can be applied.

The multiprocessor computer illustrated in FIG. 1 has two types of processors, namely two of what are referred to as basic processors BAP, as well as a number of call or switching processors CAP0–CAP9. Input/output controllers IOC0–IOC3 are also illustrated in FIG. 1.

All of the mentioned processors or, respectively, input/output controllers have a local memory LMY in which is stored essentially the dynamically-important code parts as well as some frequently-employed data to be allocated only to the respective processor. The input/output controllers also have redundant processing units PU as well as an interface circuit CI by way of which a connection to a redundant bus B:CMY0, B:CMY1 occurs. By way of this bus, the processors have access to a common memory CMY0, CMY 1 that is likewise redundant and whose two halves are each respectively divided into memory banks MYB0–MYB3.

Of the two basic processors BAP of the illustrated multiprocessor computer, the one referred to below as the basic master processor BAPM assumes both switching-oriented and non-switching oriented functions, i.e. particularly operations-oriented functions and the other, referred to below as the spare basic processor BAPS is available as a redundant processor in order to assume the functions of the master basic processor BAPM given an outage thereof. In what is referred to as a mono-operating mode, the spare basic processor BAPS, in a standby mode, has no further jobs to execute, this meaning that although its data base is kept on an updated level with that of the master basic processor BAPM, no processing is started. In what is referred to as a multimode, a part of the processing capacity of the spare basic processor BAPS is utilized for the execution of switching-oriented jobs.

The call processors CAP0–CAP9 serve only for the execution of the switching technology, whereby they are equally authorized with respect to the nature and the scope of executing switching-oriented processes. The task of the input/output controller IOC, finally, is to decouple the periphery from the central bus and to contribute to the control thereof.

The non-switching oriented processes predominantly involve operations and reliability-oriented processes; the switching-oriented processes predominantly involving processes which concern call establishment and clearing of connections. In the higher-ranking sense, however, all of those processes are considered nonswitching-oriented processes that are exclusively executed by the master processor BAP, by contrast whereto all other processes that are included among the switching-oriented processes, i.e. those that in addition to being executed on the master basic processor BAPM are executed on the spare basic processor BAPS, as well dependent of operating mode however, and are respectively executed on all of the call processors CAP.

An interprocess communication occurs in which messages are transmitted and received or, respectively, wherein data is sent that has arise in the execution of switching-oriented processes for to the nonswitching-oriented processes between the switching-oriented processes and the nonswitching-oriented processes. During the interruption of the nonswitching-oriented processes, no messages directed to the switching-oriented processes arise. The messages that result from the switching-oriented processes and which are directed to the nonswitching-oriented processes must be erased during the interruption of the nonswitching-oriented processes. The prerequisite, therefore, that the interruption of the message traffic in this direction during the interruption of the nonswitching-oriented processes cannot lead to disturbances is an appropriate de-interlacing of the switching-oriented processes and the nonswitching-oriented processes.

Data that arise during the execution of switching-oriented processes and which is directed to the nonswitching-oriented processes is, according to the present invention, intermediately stored until a restart of the nonswitching-oriented processes. Alternatively, a repetition of the subscriber inputs can also be requested on the basis of a corresponding signaling until the interruption of the nonswitching-oriented processes is ended.

The conditions resulting, implemented restart according to the present invention, shall be set forth in greater detail below with reference to FIGS. 2–4.

Figure 2:
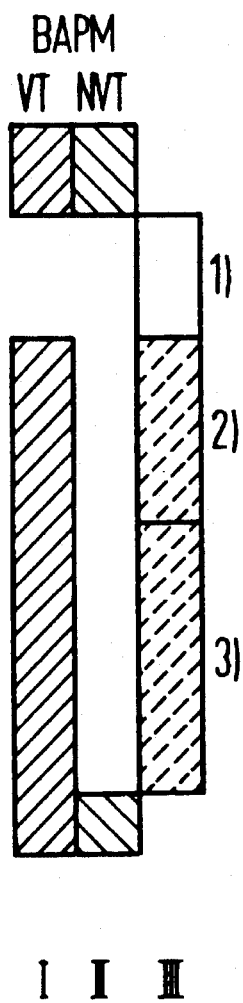
FIGS. 2–4 are timing diagrams illustrating various embodiments of the method of the present invention with respect to transmission timing.

The conditions illustrated in FIG. 2 relate to a restart on the basis of a software error, insofar as they are executed on the master basic processor BAP, that as presented, must execute both switching-oriented and nonswitching-oriented processes.

Column I of FIG. 2 thereby illustrates chronological conditions of the switching-oriented processes that, in the case of a restart, are, according to the present invention, interrupted only briefly on the order of magnitude of 200 ms, whereby this interruption is essentially made use of for protecting the error indices with respect to an error handling, Section 1 in Column III.

This brief-duration interruption for the purpose of indices protection also occurs at the second or spare basic processor BAPS or, respectively, at the other or call processors CAP0–CAP9 that only execute switching-oriented jobs insofar as the restart is initiated in a program-controlled manner. In case of an initialization of a restart due to a command of a user, the interruption for an indices protection is eliminated at the latter processors. As Column II of FIG. 2 shows, the nonswitching-oriented processes are aborted in comparison thereto and are not restarted until the production of an initial condition, so that interruption times on the other of magnitude of more than 10s arise for these processes. As Column II of FIG. 2 illustrates, this interruption time is composed, in addition to the first interruption for the indices protection of Section 1, that is also effective for the switching oriented processes, of a second time interval (Section 2) wherein the enablement of the operating circuits for the nonswitching-oriented processes results as well of a third time interval (Section 3) that is required for the actual restart of the nonswitching-oriented processes.

Figure 3:
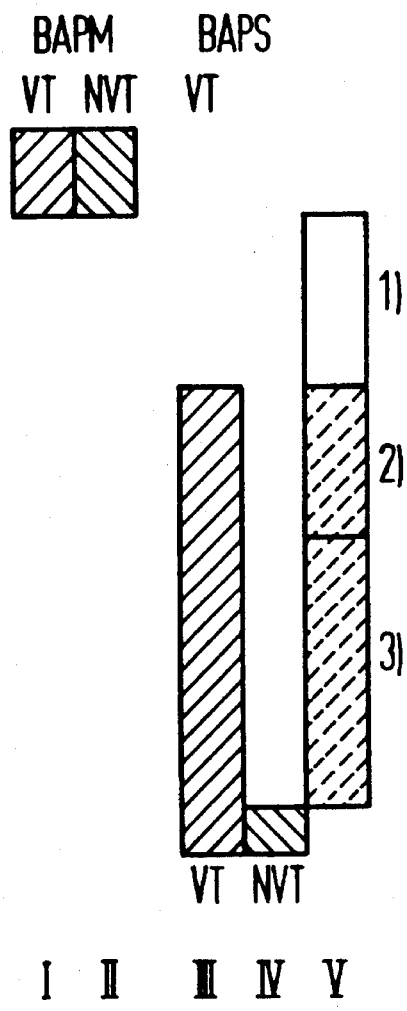

FIG. 3 illustrates the conditions that result, according to the present restart concept of the present invention, in conjunction with a switching from a master basic processor BAPM to the spare basic processor BAPS caused by a hardware fault, in particular for the case of the mentioned monomode operation. As Columns I and II show, the execution of the switching-oriented processes as well as of a nonswitching oriented processes is permanently aborted at the master basic processor BAPM until the hardware fault has been eliminated. The continued running of the switching-oriented processes on the new master basic processor, however, cannot occur here after an equally-short interruption time as illustrated in accordance with FIG. 1 since the actual switching processes belong to the switching-oriented process which was not yet started in the operating mode. A short-time start of the mentioned actual switching process is therefore undertaken after a time interval that, as in the case of FIG. 1, serves the purpose of indices protection, but without initializing the data base, so that the interruption times do not exceed 2s, see (Section 1 ) of Column V.

Other than the time span, (Section 1 ) in Column V, essentially required operation device for the nonswitching-oriented processes, as well as a time interval (Section 3) in Column V for the start of the nonswitching-processes that are both considerably longer, namely lie on the order of magnitude of 100s. These time intervals elapse here until the assumption of the execution of nonswitching-oriented processes on the former spare basic processor which is now the master basic processor.

Figure 4:
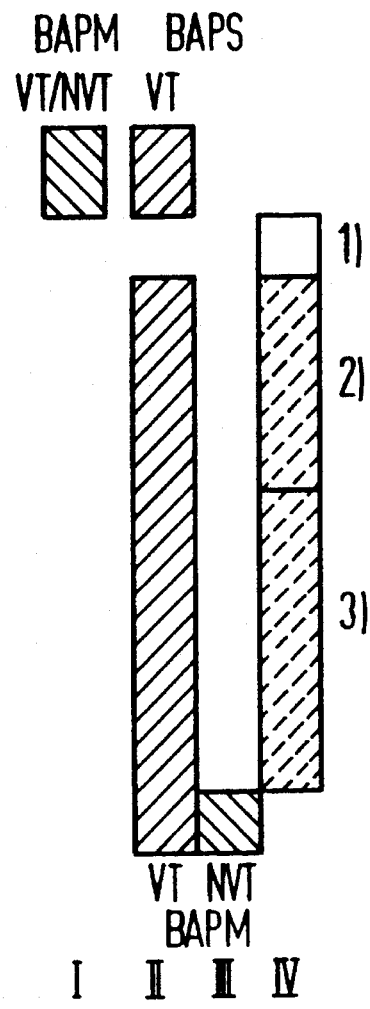

FIG. 4 shows the time condition according to the present invention of an implemented restart on the basis of a hardware fault of the master basic processor BAPM, given the assumption of the aforementioned multi-mode operation.

In such a multi-mode operation, switching-oriented processes are already ongoing in such an operation on the spare basic processor BAPS at the time of a hardware-caused switching from the master basic processor BAPM to the spare basic processor BAPS. These switching-oriented processors can merely continue to run, as in the condition set forth with reference to FIG. 1, after only a short interruption that serves the purpose of indices protection, see Column II in FIG. 4. Only the switching-oriented processes that have not yet started must therefore be started.

The non-switching oriented processes, by contrast, are aborted during the course of such a switching, see Column I of FIG. 4, and are resumed only after an enablement of the operating device and a restart on the new basic processor BAPM, to which end times corresponding to length with those in the case of FIG. 3 are required.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for restart of a multiprocessor computer of a telecommunications system of the type having a plurality of processors of which one of the processors implements both switching-oriented processes and nonswitching-oriented processes that are dependent upon one another and the others of the processors only implement switching-oriented processes, the improvement comprising the steps of:

(a) making the switching-oriented processes and the nonswitching-oriented processes temporarily independent of one another when the nonswitching-oriented processes are aborted, and erasing messages resulting from the switching-oriented processes and to such an extent that station traffic between the processors is interrupted for only a short time period;

(b) in response to errors which do not lie in the execution of the switching-oriented processes, aborting the nonswitching-oriented processes while continuing to perform the switching-oriented processes without interruption;

(c) intermediately storing data arising in the switching-oriented processes and intended for processing in nonswitching-oriented processes, the data being stored from the interruption of the station traffic until a restart of the nonswitching, oriented processes;

(d) discarding data arising due to user inputs, relative to the nonswitching-oriented processes, after an abortion and before the restart of the nonswitching-oriented processes;

(e) restarting the nonswitching-oriented processes using said stored data;

(f) outputting a request for repeating said user inputs.

2. A method for restart of a multiprocessor computer of a telecommunications system of the type having a plurality of processors of which one of the processors implements both switching-oriented processes and nonswitching-oriented processes that are dependent upon one another and the others of the processors only implement switching-oriented processes, the improvement comprising the steps of:

(a) making the switching-oriented processes and the nonswitching-oriented processes temporarily independent of one another when the nonswitching-oriented processes are aborted, and erasing messages resulting from the switching-oriented processes and to such an extent that station traffic between the processors is interrupted for only a short time period;

(b) in response to errors which do not lie in the execution of the switching-oriented processes, aborting the nonswitching-oriented processes while continuing to perform the switching-oriented processes without interruption;

(c) intermediately storing data arising in the switching-oriented processes and intended for processing in nonswitching-oriented processes, the data being stored from the interruption of the station traffic until a restart of the nonswitching-oriented process;

(d) receiving user inputs relative to the nonswitching-oriented processes after the abortion and before the restart;

(e) intermediately storing said user inputs; and (f) restarting the nonswitching-oriented processes using said stored data and using said user inputs.

3. The method of claim 1, wherein a spare one of the processors is maintained in a standby mode to replace said one processor for both switching-oriented processes and nonswitching-oriented processes, and wherein step (d) further comprises:

in response to a hardware fault in said one processor, switching to the spare processor.

4. The method of claim 1, in which a spare processor is maintained in a standby mode for taking over tasks of the one of the processors that is a master processor that executes both switching-oriented and nonswitching-oriented processes, and wherein step (d) further comprises:

following a switching from the one processor to the spare processor due to a hardware fault at the previous master or one processor, said spare processor subsequently assuming the role of the master processor and all processes serving for the execution of switching-oriented processes being started on this processor without initialization of an appertaining data base.

\* \* \* \* \*